United States Patent
Fernando et al.

(10) Patent No.: US 10,632,708 B2
(45) Date of Patent: Apr. 28, 2020

(54) INSULATING FILM

(71) Applicant: Alienus Film, LLC, Henderson, NV (US)

(72) Inventors: Primal Fernando, Henderson, NV (US); Stephen Fischer, Berthoud, CO (US); Michael Skvarla, Lansing, NY (US); Marcus Gingerich, Newfield, NY (US); Rob Watson, New York, NY (US)

(73) Assignee: Alienus Film LLC, Los Vegas, NV (US)

( * ) Notice: Subject to any disclaimer, the term of this patent is extended or adjusted under 35 U.S.C. 154(b) by 0 days.

(21) Appl. No.: 15/445,981

(22) Filed: Feb. 28, 2017

(65) Prior Publication Data

US 2017/0246829 A1 Aug. 31, 2017

Related U.S. Application Data

(60) Provisional application No. 62/301,020, filed on Feb. 29, 2016.

(51) Int. Cl.
*B32B 3/12* (2006.01)
*B32B 3/06* (2006.01)
(Continued)

(52) U.S. Cl.
CPC .............. *B32B 3/12* (2013.01); *B32B 3/06* (2013.01); *B32B 5/18* (2013.01); *B32B 5/20* (2013.01);
(Continued)

(58) Field of Classification Search
CPC . E04B 1/803; E04B 1/806; E04B 1/78; E04B 1/80; E04B 1/88; E04B 1/90;
(Continued)

(56) References Cited

U.S. PATENT DOCUMENTS

| | | | | |
|---|---|---|---|---|
| 4,148,775 A | * | 4/1979 | Shima | C08G 61/02 524/169 |
| 4,204,015 A | * | 5/1980 | Wardlaw | B32B 17/10036 428/34 |

(Continued)

FOREIGN PATENT DOCUMENTS

| | | |
|---|---|---|
| EP | 2657278 | 10/2013 |
| EP | 2993040 | 3/2016 |

(Continued)

OTHER PUBLICATIONS

PCT International Search Report, PCT/US2017/020055, dated Jun. 27, 2017.

*Primary Examiner* — Z. Jim Yang
(74) *Attorney, Agent, or Firm* — Kristin C. Hiibner

(57) ABSTRACT

An energy efficient film comprising of first and second substrate layers and microstructures positioned between the first and second substrates is provided. The microstructures are positioned between the first and second structures such that a vacuum environment is created between the first and second substrates. In one embodiment, the insulating film includes a first substrate, a second substrate, and a plurality of microstructures positioned between the first substrate and the second substrate, such that a vacuum environment is created between the first and second substrates and within each microstructure cell, individually. Preferably, the plurality of microstructures is a polygonal cellular network positioned between a first transparent substrate and a second transparent substrate. A gasket may be provided on one or both of the first or second substrates. The gasket may also be provided on outer edges of the first and/or the second substrate.

18 Claims, 3 Drawing Sheets

(51) Int. Cl.
   *B32B 7/12*       (2006.01)
   *B32B 27/36*      (2006.01)
   *B32B 37/00*      (2006.01)
   *B32B 37/14*      (2006.01)
   *B32B 27/08*      (2006.01)
   *B32B 27/32*      (2006.01)
   *B32B 5/20*       (2006.01)
   *B32B 5/18*       (2006.01)
   *B32B 27/06*      (2006.01)
   *B32B 27/34*      (2006.01)
   *E04B 1/80*       (2006.01)
   *E04B 1/76*       (2006.01)

(52) U.S. Cl.
   CPC .............. *B32B 7/12* (2013.01); *B32B 27/065* (2013.01); *B32B 27/08* (2013.01); *B32B 27/32* (2013.01); *B32B 27/34* (2013.01); *B32B 27/36* (2013.01); *B32B 27/365* (2013.01); *B32B 37/003* (2013.01); *B32B 37/146* (2013.01); *E04B 1/7608* (2013.01); *E04B 1/803* (2013.01); *B32B 2250/03* (2013.01); *B32B 2255/10* (2013.01); *B32B 2255/20* (2013.01); *B32B 2255/26* (2013.01); *B32B 2255/28* (2013.01); *B32B 2305/022* (2013.01); *B32B 2305/024* (2013.01); *B32B 2305/026* (2013.01); *B32B 2307/304* (2013.01); *B32B 2307/412* (2013.01); *B32B 2307/416* (2013.01); *B32B 2307/546* (2013.01); *B32B 2309/68* (2013.01); *B32B 2367/00* (2013.01); *B32B 2509/10* (2013.01); *B32B 2605/006* (2013.01); *B32B 2607/02* (2013.01); *Y10T 428/24149* (2015.01); *Y10T 428/24165* (2015.01); *Y10T 428/24777* (2015.01)

(58) Field of Classification Search
   CPC .............. B32B 3/12; Y10T 428/24149; Y10T 428/24165; Y10T 428/24661
   See application file for complete search history.

(56) References Cited

U.S. PATENT DOCUMENTS

| | | | | |
|---|---|---|---|---|
| 4,358,490 | A * | 11/1982 | Nagai | B32B 3/12 428/34 |
| 4,531,511 | A * | 7/1985 | Hochberg | E06B 3/6612 126/706 |
| 5,018,328 | A | 5/1991 | Cur et al. | |
| 5,354,195 | A * | 10/1994 | Dublinski | B29C 33/38 425/504 |
| 6,528,131 | B1 * | 3/2003 | Lafond | E06B 3/66328 428/34 |
| 6,828,001 | B2 * | 12/2004 | Tokonabe | B32B 3/12 428/69 |
| 8,313,818 | B2 * | 11/2012 | Vo | B29C 44/5627 428/69 |
| 2002/0106482 | A1 * | 8/2002 | Bourlier | B29D 11/0073 428/116 |
| 2002/0170265 | A1 * | 11/2002 | Tokonabe | E04C 3/34 52/834 |
| 2003/0101672 | A1 * | 6/2003 | Di Gregorio | E04B 1/803 52/409 |
| 2005/0042416 | A1 * | 2/2005 | Blackmon | B32B 3/12 428/116 |
| 2005/0048231 | A1 * | 3/2005 | Morphet | B32B 3/12 428/34 |
| 2005/0123717 | A1 * | 6/2005 | Shen | B32B 3/12 428/116 |
| 2005/0136198 | A1 * | 6/2005 | Bourlier | B32B 3/12 428/34 |
| 2005/0161154 | A1 * | 7/2005 | Anderson | B29C 70/34 156/278 |
| 2005/0167036 | A1 * | 8/2005 | Yokoyama | C09J 7/10 156/230 |
| 2006/0003138 | A1 * | 1/2006 | Kaczmarek | E04B 1/803 428/69 |
| 2006/0024469 | A1 * | 2/2006 | Tenra | E04B 1/803 428/69 |
| 2006/0029777 | A1 * | 2/2006 | Yanai | E04B 1/806 428/178 |
| 2007/0122588 | A1 * | 5/2007 | Milburn | E06B 3/663 428/117 |
| 2007/0212516 | A1 * | 9/2007 | Conterno | B32B 27/36 428/116 |
| 2007/0243358 | A1 * | 10/2007 | Gandini | B32B 3/12 428/119 |
| 2008/0115883 | A1 * | 5/2008 | Mishima | G02F 1/1303 156/273.3 |
| 2009/0252921 | A1 * | 10/2009 | Bottler | B29C 70/086 428/116 |
| 2010/0255225 | A1 * | 10/2010 | Cording | C03C 17/3417 428/34 |
| 2010/0266808 | A1 * | 10/2010 | Klein | B29O 43/3642 428/116 |
| 2011/0165367 | A1 * | 7/2011 | Kojima | E04B 1/803 428/69 |
| 2012/0031957 | A1 * | 2/2012 | Whitaker | B32B 3/12 229/103.11 |
| 2012/0048487 | A1 * | 3/2012 | Brewster | B32B 3/12 160/368.1 |
| 2012/0118002 | A1 * | 5/2012 | Kim | F16L 59/065 62/440 |
| 2012/0321835 | A1 * | 12/2012 | Hethcock, Jr. | B29O 70/086 428/73 |
| 2012/0324806 | A1 * | 12/2012 | Chen | E06B 3/28 52/172 |
| 2013/0029082 | A1 * | 1/2013 | Park | E04B 1/803 428/69 |
| 2013/0149481 | A1 * | 6/2013 | Hiemeyer | E04B 1/803 428/47 |
| 2014/0141192 | A1 * | 5/2014 | Fernando | E06B 3/6775 428/76 |
| 2014/0224408 | A1 * | 8/2014 | Kuntz | B32B 37/04 156/87 |
| 2015/0079363 | A1 * | 3/2015 | Free | B32B 37/025 428/210 |
| 2015/0159800 | A1 * | 6/2015 | Kimura | E04B 1/78 428/69 |
| 2016/0138324 | A1 * | 5/2016 | Lameris | E06B 3/6612 52/786.13 |
| 2016/0185069 | A1 * | 6/2016 | Zhao | B32B 3/12 428/593 |
| 2016/0369936 | A1 * | 12/2016 | Hwang | F16L 59/029 |
| 2017/0165946 | A1 * | 6/2017 | Poupa Parsigneau | C01B 32/30 |
| 2017/0234487 | A1 * | 8/2017 | Shima | B63B 25/16 220/1.5 |
| 2017/0368799 | A1 * | 12/2017 | Barbetta | B32B 15/085 |
| 2018/0072018 | A1 * | 3/2018 | Liu | B32B 5/18 |
| 2018/0274289 | A1 * | 9/2018 | Whitehead | A01G 9/222 |
| 2018/0347181 | A1 * | 12/2018 | Herfurth | B32B 9/048 |
| 2018/0371749 | A1 * | 12/2018 | Rahbek | B32B 5/00 |

FOREIGN PATENT DOCUMENTS

| | | |
|---|---|---|
| WO | 2006003199 | 1/2006 |
| WO | 2014178540 | 11/2014 |

* cited by examiner

INSULATING FILM

CROSS-REFERENCE TO RELATED APPLICATIONS

This Application claims the benefit of U.S. Provisional Patent Application No. 62/301,020 filed Feb. 29, 2016, the entire contents of which is incorporated herein by reference.

BACKGROUND

Ordinary materials transfer energy by (1) non-solar heat gain by direct conduction, convection, and radiation; (2) solar heat gain in the form of radiation; and (3) airflow from both ventilation and infiltration through the material. Common insulating materials are designed to block conductive or convective heat transfer or reflect radiant heat. Common insulating materials include: bulky fiber materials, such as fiberglass, rock and slag wool, cellulose, and natural fiber; foams and other air trapping systems; and reflective insulation systems, such as reflective foils. Bulky fiber materials insulate by resisting conductive and—to a lesser degree—convective heat flow in a cavity. Air trapping systems, such as spray foams and rigid foam boards trap air or another gas to resist conductive heat flow. Reflective insulation systems reflect radiant heat away from living spaces, making them particularly useful in warm climates, but do not insulate against cold.

Currently, a common method of insulating is using fiberglass insulation. Fiberglass has high insulating capabilities, but requires space that could otherwise be saved by using a more efficient and thinner material, decreasing the square-footage that could be utilized for other things. Additionally, fiberglass' insulating capabilities can decrease by up to 40% in low temperatures and up to 30% in high humidity environments. Furthermore, small tears greatly compromise efficiency, and any resulting moisture can cause a loss of up to 50% of its insulation capabilities. The refrigerator, an appliance that greatly depends on insulation for its function, is generally fitted with polyurethane foam as its insulator. While polyurethane foams are effective insulators and have strong structural integrity, they are not durable and gradually disintegrate, especially in hot or humid conditions. Additionally, polyurethane releases toxic fumes when burned, making it extremely environmentally unfriendly and difficult to dispose of after its inevitable deterioration. Most ordinary, non-insulating materials need costly modifications or bulky additions to insulate well.

Therefore, it would be advantageous to provide a thermally-versatile insulating film for warm, cold, and humid climates that insulates against thermal energy transfer. Furthermore, it would be advantageous to provide a flexible film that can be applied to a variety of surfaces, both planar and non-planar. Additionally, it would be advantageous to provide thermally efficient films that transmit a maximum fraction of incident visible light intensity for transparent surfaces such as windows.

SUMMARY

According to one embodiment of the invention, a film is provided. The film includes a first transparent substrate, a second transparent substrate, microstructures deposited between the first transparent substrate and the second transparent substrate to form a vacuum environment in between the first and second substrates. A gasket may be provided on one of the substrate layers. The gasket may be provided on outer edges of the first and/or second substrate layers and around the micro structural layer 104.

The film may also include a transparent conductive layer provided between the first substrate and the micro structural layer. In this embodiment, the gasket may also be provided on outer edges of the first transparent substrate, the second transparent substrate, and/or the transparent conductive layer. The gasket may be an adhesive.

The film may also include an infrared (IR) reflecting layer and/or an ultraviolet (UV) reflecting layer and/or he film may also include at least one polarizing layer or additional layers to enhance the performance of the film. In addition, the film may also include a polyamide layer arranged between the micro structural layer and the conductive layer. The first and/or second substrate may be substantially flexible to conform to a curved surface.

According to another embodiment of the invention, a method of preparing a film is provided. The method includes providing a first substrate and depositing a gasket on a surface of the first substrate adjacent to an outer edge of the first substrate. A microstructure layer is then positioned or deposited on the gasket and a second substrate is positioned on the microstructure layer, with an intermediate material or gasket to seal the microstructure layer to the second substrate. A vacuum is created in the microstructure layer and the layer is sealed to create an evacuated microstructure layer positioned between the first and second substrates.

BRIEF DESCRIPTION OF THE DRAWINGS

These and other features, aspects and advantages of the present invention will become better understood from the following description, appended claims, and accompanying figures, where like numbers reference like elements. The figures described should not be interpreted as indicating relative proportions of the components therein, where:

DESCRIPTION

According to the present invention, an insulating film is provided. The insulting film may be applied to a surface and provide a thermally insulating barrier to the transfer of heat into or out of vehicles or buildings. The insulating film may be applied to a variety of surfaces such as metal, drywall, polymers, glass, or other surfaces to provide thermal insulation. For example, the insulating film may be applied to refrigerator interiors that require thermal insulation and protection from heat loss. The insulating properties of the insulating film are derived from the materials and construction methods used in constructing the film, as discussed in further detail below. In other embodiments, the insulating film may have additional layers, such as reflective layers to provide both thermal insulation and reflective insulation.

The insulating film according to embodiments of the invention may be flexible, and may be applied on the surface of a variety of materials. The insulating film is also durable and thin enough to be applied to flexible, frequently-in-contact material. In some embodiments, the insulating film includes a shock absorbing layer and/or a protective layer to prevent damage to the film and the material surface it is applied to. The insulating film may also be formed to provide a safety layer, in order to convert regular materials to have increased resistance to shattering or breaking, for example as in automobile windshields. The insulating film according to the present invention comprises first and second substantially flexible layers, and one or more thermally insulating layers, such as a micro structural layer, positioned between the first and second substantially flexible layers. The film may include one or more IR and/or UV reflecting or absorbing layers.

The insulating film may be applied on a surface that is already installed, such as in temperature-controlled containers, residential homes, commercial buildings, transportation vehicles, appliances, walls, and windows. The insulating film does not need to be sandwiched between two surfaces or layers of any material. In some embodiments, the film may be self-supporting.

Figure 1A:
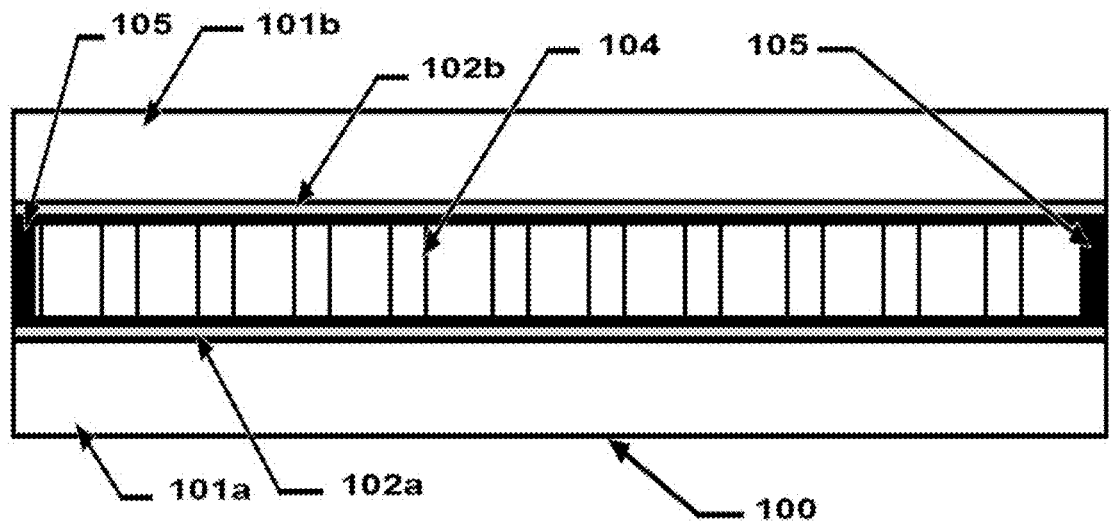
FIG. 1A is a schematic drawing showing a cross sectional view of an assembled insulating film showing microstructures positioned between first and second substrate layers, according to one embodiment of the invention.

Referring now to FIG. 1A, a schematic drawing of an insulting film 100 according to one embodiment of the present invention is shown. As shown in FIG. 1A, the film 100 comprises a first substrate layer 101a (bottom layer) and second substrate layer 101b (top layer). The first and second substrate layers 101a and 101b are preferably transparent substrate layers, which more preferably are substantially flexible. In one embodiment, one or both of the substrate layers 101a and 101b are a substantially flexible polymer that has enough flexibility to conform to a curved surface, such as a curved window or the curves in the outside body of an automobile. However in other embodiments, one or both of the transparent substrate layers 101a and 101b comprise a reflective or non-transparent material. In some embodiments, the insulating film 100 has a high visible light transmittance, such as greater than 80%. According to this embodiment, suitable first and second substrate layers 101a and 101b include polyethylene films and other polymeric films, such as polyester, triacetate, or polycarbonate. One example of a transparent substrate layer is polyethylene terephthalate (PET).

As also shown in FIG. 1A, a gasket 105 is positioned between the first and second substrate layers 101a and 101b, and one or more adhesive layers 102a and 102b are positioned on each side of the first and second substrate layers 101a and 101b. The gasket 105 is positioned on the outer perimeter of one or more edges of the film 100, and on the top and bottom sides of the microstructure layer 104. The gasket 105 may be an adhesive, such as pressure sensitive adhesive, a heat sensitive adhesive, a moisture sensitive adhesive, or a UV-curable adhesive. The gasket 105 seals the film, may provide structural support for the film, and may maintain the desired arrangement and spacing of the layers.

Figure 3A:
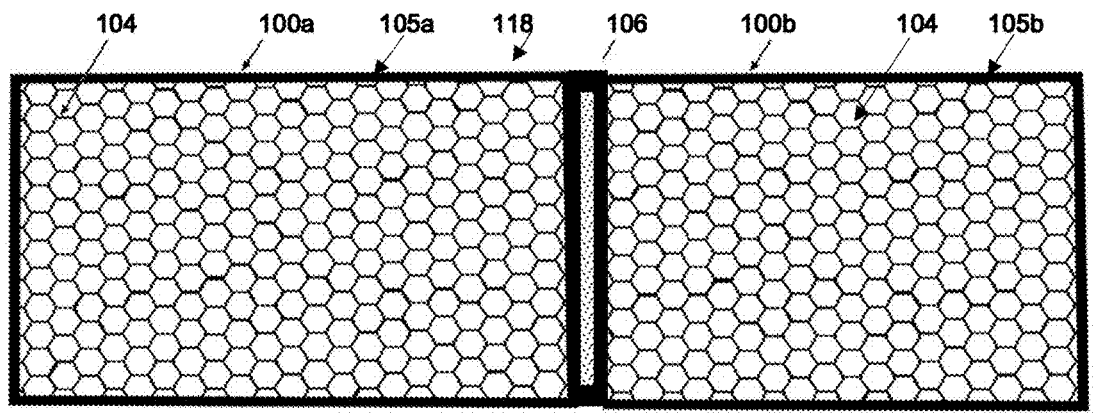
FIG. 3A is a top view of an insulting film according to another embodiment of the invention, schematically showing a plurality of films arranged in film cells to form a multi-cell film.
Figure 3B:
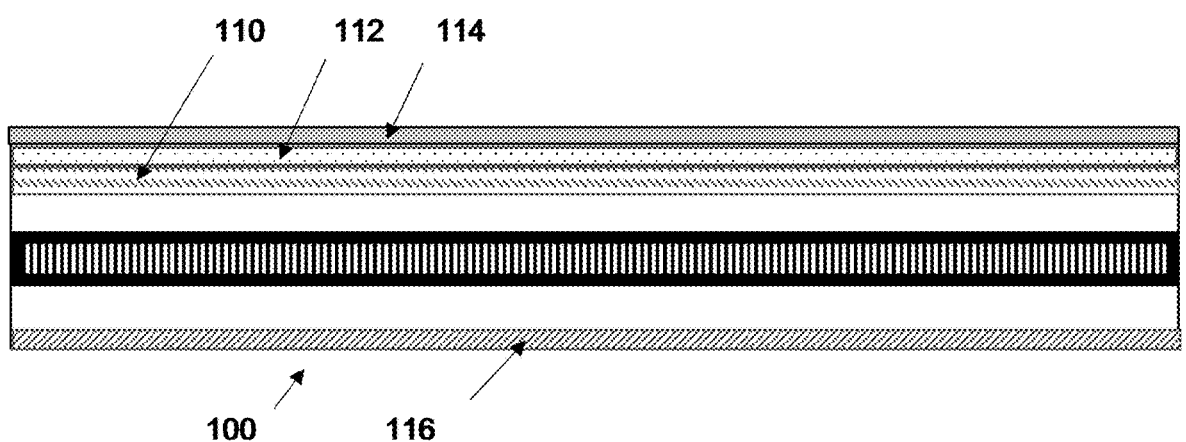
FIG. 3B is a cross sectional view of a film according to the invention with supplemental layers.

As shown in FIG. 3B, in some embodiments, the gasket 105 is the same material as the one or more adhesive layers 102a and 102b, and the one or more adhesive layers 102a and 102b are used to form the gasket 105. In this embodiment, the one or more adhesive layers 102a and 102b are omitted and the gasket 105 is positioned directly on the first and second substrate layers 101a and 101b.

In the interior of the film 100, a microstructure layer 104 is positioned between the gasket 105 and also in-between the first and second substrate layers 101a and 101b. Although the term "microstructure" is used herein, it will be understood that the term "micro" refers to a small internal support structure, which may have a variety of sizes and configurations, and preferably, is a nanoscale structure positioned within the gasket 105.

The insulating film 100 may also have one or more optional transparent conductive layer(s) (not shown), deposited on one of the first or second substrate layers 101a and 102a. The transparent conductive layers may include, for example, transparent metal oxides, such as indium tin oxide, or other oxide layers, such as zinc oxide, or any other compounds that enhance the energy efficiency of the film. Other examples of materials for the substrate include one or more layers of graphene, low-e coatings, such as Solarban® products, commercially available from PPG Industries, and other low-e coatings known to those of skill in the art.

In certain embodiments, the film 100 may contain one or more polyamide layers. For example, a polyamide layer may be deposited on top of the transparent conductive layer, or at any other appropriate position. After deposition of the polyamide layer, the polyamide layer may be cured with heat. The polyamide layer imparts enhanced thermal properties to the film, because the polymer within the polyamide layer absorbs some of the heat that is incident on the film. Accordingly, less heat reaches the micro structural layer, and the thermal insulation provided by the film is improved. Again, the one or more polyamide layers are not required, and may be omitted from the film 100.

Figure 2A:
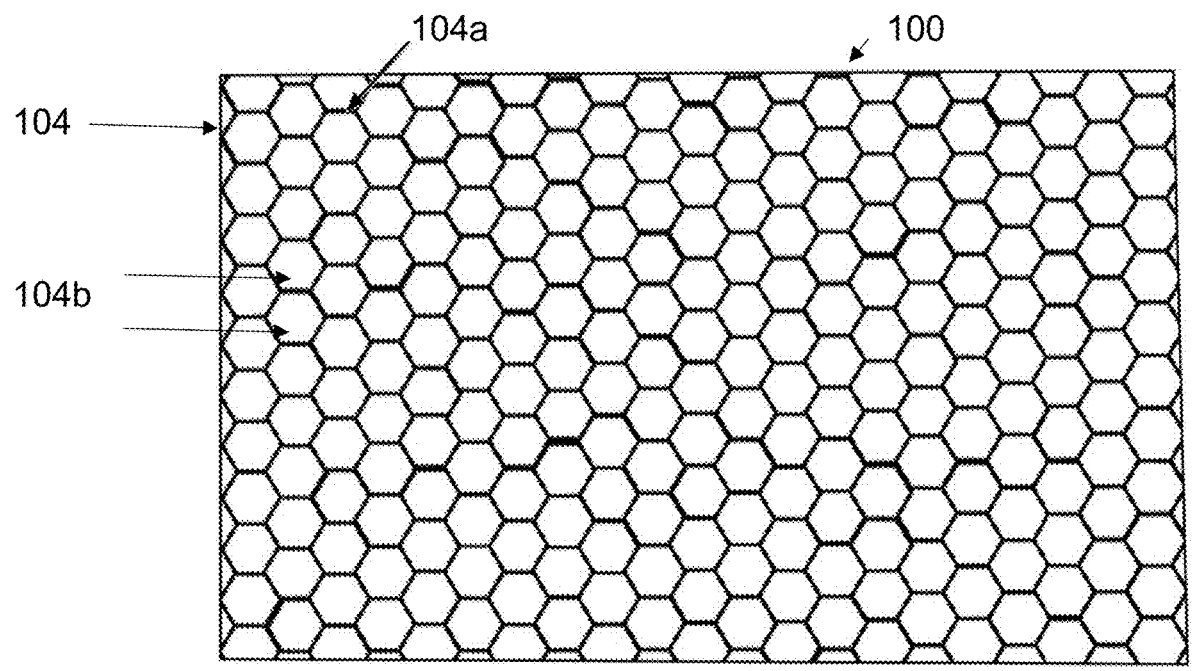
FIG. 2A is a top view of an insulating film showing the microstructures in a micro structural network, according to another embodiment of the invention.
Figure 2B:
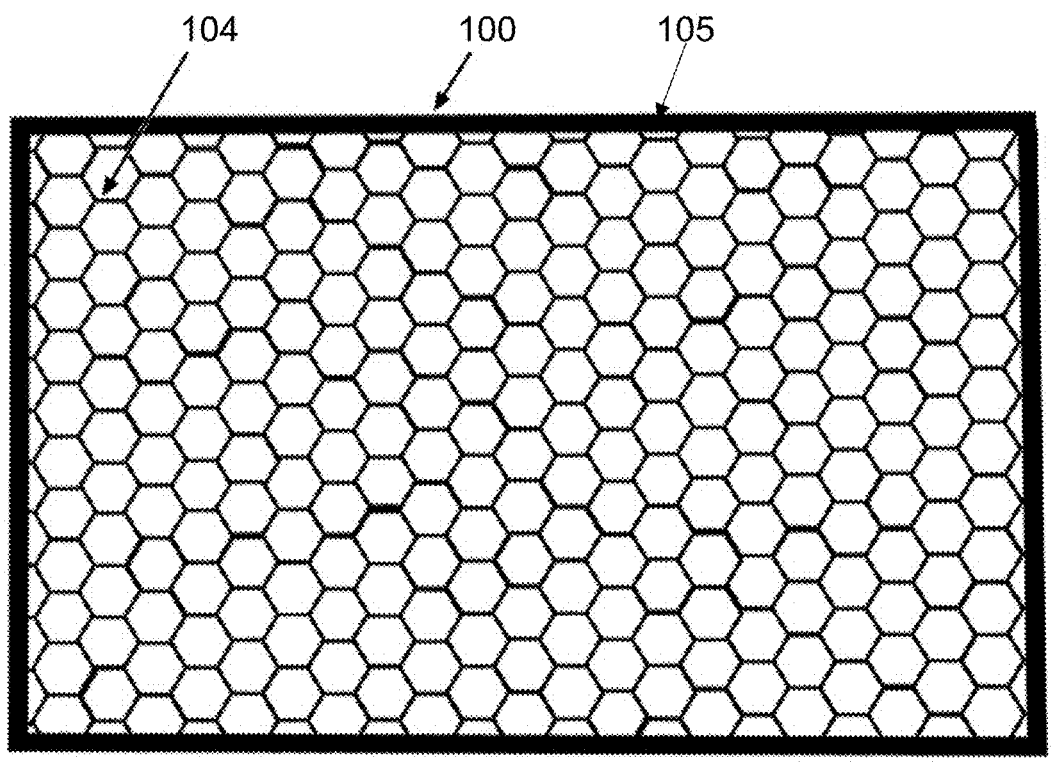
FIG. 2B is a top view the insulating film schematically showing the microstructures in a micro structural network and a gasket surrounding the film according to another embodiment of the invention.

Referring now to FIG. 2B a top view of an insulating film, showing the microstructures 104a in a microstructure cell network 104b, according to another embodiment of the invention is shown. Referring to FIG. 2B, a top view the insulating film, showing the microstructures 104a in a micro structural network 104b, and a gasket 105 surrounding the film is shown. The microstructure layer 104 may be positioned on the gasket 105, either by forming the microstructures 104a directly on one side of a bottom side of the gasket 105, and then positioning another top side of the gasket 105 on the top side of the microstructure layer 104, or alternatively, positioning a pre-formed microstructure layer 104 directly on one side of the bottom side of the gasket 105, and then positioning another top side of the gasket 105 on the top side of the microstructure layer 104. In some embodiments, once the microstructure layer 104 is positioned in between the gasket 105, the film is evacuated to form a vacuum within the gasket 105 and the gasket 105 is sealed.

The microstructure layer 104 may be formed with a variety of configurations. As shown in FIG. 2A and FIG. 2B, the microstructure layer 104 is formed with a microstructure cell network 104B. As show in this embodiment, the microstructure cell network 104B is a honeycomb configuration, and each cell is an individual vacuum cell. However, as will be understood by those of skill in the art, other configurations are possible within the scope of the invention. The microstructure layer 104, may be formed from a variety of materials. In some embodiments, the microstructure layer 104 is formed from a transparent material. In other embodiments, the microstructure layer 104 is formed from a non-transparent or reflective material. The material used for the microstructure layer is preferably a non-conductive or insulating material.

Referring again to FIG. 1A and referring to FIG. 3B, a preferred embodiment of the film 100 is shown. The film 100 shown in FIG. 3B is constructed for minimizing radiation entering an interior space through the film. The multi-layer film includes two or more substantially flexible transparent films 101a and 101b. The transparent films 101a and 101b are adhered to each other via an adhesive layer 102a and 102b. The substantially flexible and transparent film 100 may be an outdoor side 101b, and an indoor side 101a, and may have a polarizer 110 and/or a UV-resistant film attached 112 to the outer surface of the outdoor side 101b. Additionally, the outer side of the UV film may also have an adhesive 114 on the outer surface for attachment to a glass window in another embodiment of the invention, although the adhesive 114 may be attached to the outside of the indoor side 101a in other embodiments. The polarization layer may be used to absorb or reflect a fraction of visible light, depending on the choice of polarizers and the polarization state of the light.

Referring again to FIG. 3B, the film 100 may have one or more supplementary layers 110, 112, 114, and 116 deposited onto or otherwise adhered to the first substrate layer 101a or second substrate layer 101b. Although the supplementary layers are shown as positioned in FIG. 3B, it will be understood by those of skill in the art, that the supplementary layers 110, 112, 114, and 116 may be otherwise positioned on the film 100, and each layer 110, 112, 114, and 116 is independently optional. The supplementary layers may be one or a combination of a UV protective layer, an IR reflecting layer, one or more polarizing layers, a shock absorbing layer, a protective layer, a safety layer and/or a light reflective layer. In other embodiments, overcoats, such as polymer or inorganic thin layers for prevention of penetration of moisture to the microstructure cells 104b, may also be used in accordance with embodiments of the invention.

According to another embodiment, an outer adhesive layer, for example layer 114 or 116, such as a pressure sensitive adhesive, a heat sensitive adhesive, or a moisture sensitive adhesive, may be deposited or otherwise adhered to the film 100. The outer adhesive may be used in embodiments where the film 100 is adhered to a substrate. A release layer (not shown) may also be applied to the surface of the outer adhesive, for example to the outside of one of layer 114 or 116, such that the film 100 may be transported and applied to its end purpose.

Referring now to FIG. 3A, a multi-cell insulating film 118 is shown. According to this embodiment, one or more microstructural layers 104 are positioned on a first substrate layer 101a and each microstructural layer 104 is encapsulated by a gasket 105, thus creating individual insulating film cells 100a and 100b on the larger insulting film. Each of the plurality of insulating film cells 100a and 100b are independently sealed by the gasket 105. In between each of the plurality of insulating film cells is a cell divider 106, which may a gasket material 105, or another material, or a vacuum. In some embodiments, the multi-cell insulating film 118 may be cut at the cell divider 106 to provide individual insulating films 100.

According to a preferred embodiment, the film 100 has a polarizer layer 110, more preferably, the polarizer layer 110, is reflective in nature. The reflective polarizers may be birefringence-based, or may be wire grids of metals that may further reflect IR light and at least partially block UV light.

Further, the polarizers may be absorptive in nature, in which case the selection of polarization is achieved by absorbing light in the unwanted polarization direction by the polarizing film. By including or omitting a polarizing layer, varying the amount of transparent conductive layer on the film 100, and varying the thickness of the micro structural layer 104, the U-values and SHGC may be varied. Accordingly, the properties of the films described herein can be varied to accommodate and optimize the films for various climates and different applications.

According to another embodiment of the invention, a method of improving the energy efficiency of a transparent surface is provided. According to the method, the energy efficiency of a substrate is improved by applying the insulating film 100 according to the invention to the surface of the substrate. According to one embodiment, an outer adhesive layer 114 or 116 is included on the insulating film 100 and the film is adhered to the surface of a transparent substrate. In one embodiment, the insulating film 100 is applied to an existing structure having a transparent surface, such as an aftermarket film which is applied to a car or building window. In other embodiments, the insulating film is applied to interior surfaces, such as for insulating machine parts or larger structures. In other embodiments, the insulating film 100 is formed directly on the transparent substrate. The characteristics of the thermally-insulating film may be selected according to the desired energy efficiency and solar heat gain.

As shown in FIG. 2A and FIG. 2B, the microstructures 104a and microstructure cell network 104b of the microstructure layer 104 of the insulating film impart thermal insulation to the surface that the insulating film is applied to. The insulating film 100 may also be provided with an adhesive and release layer (not shown) for ease of applying the thermally-insulating film 100 to the transparent surface.

According to another embodiment of the invention, a method of preparing a film is provided. The method includes first, providing a first transparent substrate. A bottom layer of a gasket is deposited on a surface of the first substrate layer adjacent to an outer edge of the first substrate layer. A microstructure layer is then positioned on the gasket and a top layer of a gasket is positioned on the microstructure layer. A second transparent substrate layer is also positioned on the microstructure layer and the gasket. A vacuum is created surrounding the microstructure layer and within the gasket and the gasket is sealed. In some embodiments, the gasket is sealed by curing an adhesive within the gasket.

Figure 1B:
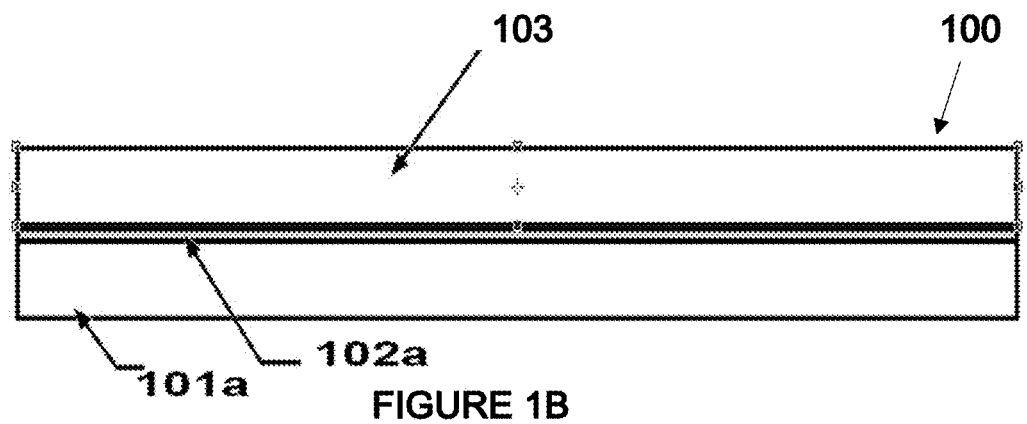
FIG. 1B is a schematic drawing showing a cross sectional view of the insulating film shown in FIG. 1A, prior to the formation of the microstructures.
Figure 1C:
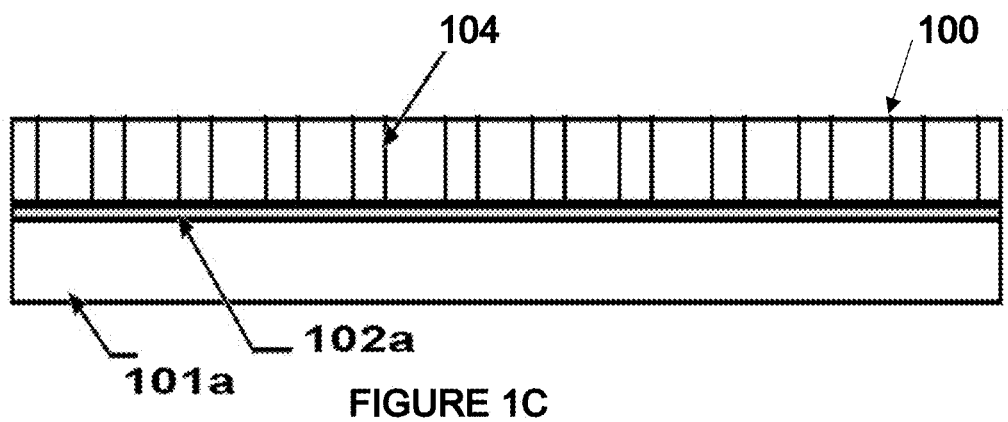
FIG. 1C is a schematic drawing showing a cross sectional view of the insulating film shown in FIG. 1B having microstructures, according to another embodiment of the invention.

Referring now to FIGS. 1B and 1C, in one embodiment, a first substrate layer 101a is provided. A bottom layer of a gasket 105, which may be the same or different as the adhesive 102a, is then positioned or deposited on the first substrate layer. The microstructure material 103 is then deposited on the first substrate layer 101a and within the boundary created by the gasket 105. The microstructure material 103 is then etched to form the micro structure layer 104, as shown in FIG. 1C. The second substrate layer 101b and a top layer of the gasket 105, which may be the same or different as the adhesive 102b are then positioned on a top side of the micro structure layer 104. In some embodiments, an outer edge gasket is also positioned on the outer edge of the material 103 and/or microstructural layer 104 to form the outer edge of the gasket 105, as shown in FIG. 1A. The space surrounding the gasket 105, micro structure layer 104, and within the microstructure cell network 104b is evacuated to form a vacuum within the gasket 105 and micro structure layer 104 and each cell in the microstructure cell network 104b. The gasket is sealed to preserve the vacuum.

In some embodiments, the gasket 105 is a cured or heat sealed to seal the microstructure layer 104 in a vacuum within the gasket 105.

In another embodiment, the microstructure layer is deposited directly on the first substrate layer 101a within the boundary created by the gasket 105. And he second substrate layer 101b and a top layer of the gasket 105, which may be the same or different as the adhesive 102b are then positioned on a top side of the micro structure layer 104. The microstructural layer 104 and gasket 105 are evacuated and sealed as described above.

In another embodiment, a first transparent conductive layer may be deposited on the first substrate layer 101a within the boundary created by the gasket 105. The first transparent conductive layer may be deposited by spraying, etching, or utilizing other deposition methods known to those of skill in the art.

According to another embodiment, a method for making the insulating film in a roll to roll production line is provided. According to the method includes, a first substrate layer 101a is provided. The first substrate layer 101a is provided as a film roll that is rolled out to a production line. Then a gasket 105 is positioned on a top side the first substrate layer 101a, and an outer edge of the first substrate layer 101a. Accordingly, the gasket 105 must be sufficiently tall to accommodate the layers. The gasket 105 may be positioned by deposition or a film which is positioned on the first substrate layer 101a. The microstructure layer is then positioned or created on the gasket 105, as described herein, either by etching a microstructure material 103, or by depositing a microstructural layer 104 directly on the gasket, either by deposition or as a film layer. The top layer of the gasket 105 is then positioned on the microstructural layer 104, either as a layer or by deposition. A second transparent substrate 101b is then provided. The second transparent substrate 101b may be provided as a film roll that is rolled out to the production line. The second substrate layer 101b is then positioned on top of the microstructure layer 104 and the gasket 105. Once the layers have been aligned to ensure direct contact between the gasket 105 and the second transparent substrate 101b, the gasket 105 is cured to create the insulating film 100. In one embodiment, the gasket 105 includes a UV-curable adhesive 102, which is cured by applying UV light. In another embodiment, at least one second film may be deposited on the insulating film 100. For example, the second film may be a supplementary film 110, 112, 114 and/or 116 as described herein, such as a protective film, shock absorbing film, an IR reflective film, a UV reflective film, safety film, light reflective layer and/or a light polarizing layer. As discussed above, the first and second transparent conductive layers are not required, and may be added or omitted from the method used to produce the film 100.

According to another embodiment of the invention, the substrate layers 101a and 101b may be substantially flexible non-transparent substrates, or a substantially flexible transparent substrate. The substantially flexible substrates form a film 100 which will be able to conform to curved or uneven surfaces.

While the foregoing written description of the invention enables one of ordinary skill to make and use what is considered presently to be the best mode thereof, those of ordinary skill will understand and appreciate the existence of variations, combinations, and equivalents of the specific embodiments, methods, and examples herein. And, although the present invention has been discussed in considerable detail with reference to certain preferred embodiments, other embodiments are possible. Therefore, the scope of the appended claims should not be limited to the description of preferred embodiments, methods, and examples contained herein.

What is claimed is:

1. A film comprising:
   a first substrate layer and a second substrate layer;
   a microstructure layer positioned between the first and second substrate layers;
   a sealed gasket having a top layer, a bottom layer, and first and second sides, the top layer, bottom layer, and first and second sides of the sealed gasket surrounding the microstructure layer, and affixed directly thereto, wherein the interior of the sealed gasket, surrounding the microstructure layer, comprises a vacuum, relative to average atmospheric pressure, and
   wherein the first substrate layer and the second substrate layer each have outer edges comprising a minor face of the layers, and the gasket is affixed directly to the minor faces of the first substrate layer and the second substrate layer, and forms an outer perimeter surrounding the microstructure layer and the first and second substrate layers, such that the gasket forms an outer edge of the film.

2. The film according to claim 1, wherein the microstructure layer comprises a microstructure cell network.

3. The film according to claim 1, wherein the microstructure layer comprises a plurality of micro cells, where each micro cell, individually, is a sealed vacuum cell.

4. The film according to claim 2, wherein the microstructure cell network comprises an interconnected polygon structure.

5. The film according to claim 1, wherein film further comprises a first transparent conductive layer provided between one of the first and second substrate layers and the vacuum layer.

6. The film according to claim 5, wherein the first transparent conductive layer has outer edges comprising a minor face of the first transparent conductive layer, and the gasket is affixed directly to the minor face of the first transparent conductive layer such that the gasket forms an outer perimeter surrounding the microstructure layer, the first and second substrate layers, and the transparent conductive layer, such that the gasket forms an outer edge of the film.

7. The film according to claim 1, further comprising at least one of an infrared (IR) reflecting layer or an ultraviolet (UV) reflecting layer.

8. The film according to claim 1, further comprising at least one polarizing layer.

9. The film according to claim 1, further comprising one or more polyamide layers.

10. The film according to claim 1, wherein one or both of the first and second substrate layers are transparent.

11. The film according to claim 1, wherein the first and second substrate layers are substantially flexible polymeric film to conform to a curved surface.

12. A multi-cell film comprising two or more films according to claim 1.

13. The multi-cell film according to claim 12, wherein each film, individually, is separated by a cell divider, and each film, individually, comprises a sealed gasket surrounding the microstructure layer, wherein the interior of the sealed gasket, surrounding the microstructure layer, comprises a vacuum, relative to average atmospheric pressure.

14. A method of preparing a film according to claim 1, the method comprising:
   a) providing a first substrate layer;

b) positioning or depositing a first gasket on a top surface of the first substrate layer;
c) positioning or depositing a microstructure layer on the first substrate layer and within the boundary formed by the first gasket;
d) positioning or depositing a second gasket on the microstructure layer;
d) positioning a second substrate layer on the microstructure layer and the second gasket;
e) applying a vacuum to the microstructure layer and within the first and second gasket; and
f) sealing the gasket to create a vacuum, relative to average atmospheric pressure, surrounding the microstructure layer.

15. The method according to claim 14 further comprising positioning or depositing an edge gasket to directly affix the edge gasket to the minor face of the first substrate layer, wherein the microstructure layer is positioned or deposited on a top surface of the first gasket and within the boundary formed by the first gasket and the edge gasket.

16. The method according to claim 14, wherein one or both of the first and second substrate layers are a transparent layer.

17. The method according to claim 14, wherein step f) comprises curing an adhesive within the gasket, within an evacuated chamber.

18. A method of preparing a film according to claim 1, on a roll-to-roll or sheet assembly, the method comprising:
a) providing a first substrate layer, the first substrate layer provided on a roll-to-roll or sheet assembly;
b) positioning or depositing a first gasket on a top surface of the first substrate layer;
c) positioning or depositing a microstructure layer on the first substrate layer and within the boundary formed by the first gasket;
d) positioning or depositing a second gasket on the microstructure layer;
d) positioning a second substrate layer on the microstructure layer and the second gasket, the second substrate layer provided on a roll-to-roll or sheet assembly;
e) applying a vacuum to the microstructure layer and within the first and second gasket; and
f) sealing the gasket to create a vacuum, relative to average atmospheric pressure, surrounding the microstructure layer.

* * * * *